Oct. 27, 1925.  
F. N. WATKINS  
1,559,483
AUTOMATICALLY SET ANIMAL TRAP
Filed April 23, 1925    2 Sheets-Sheet 1
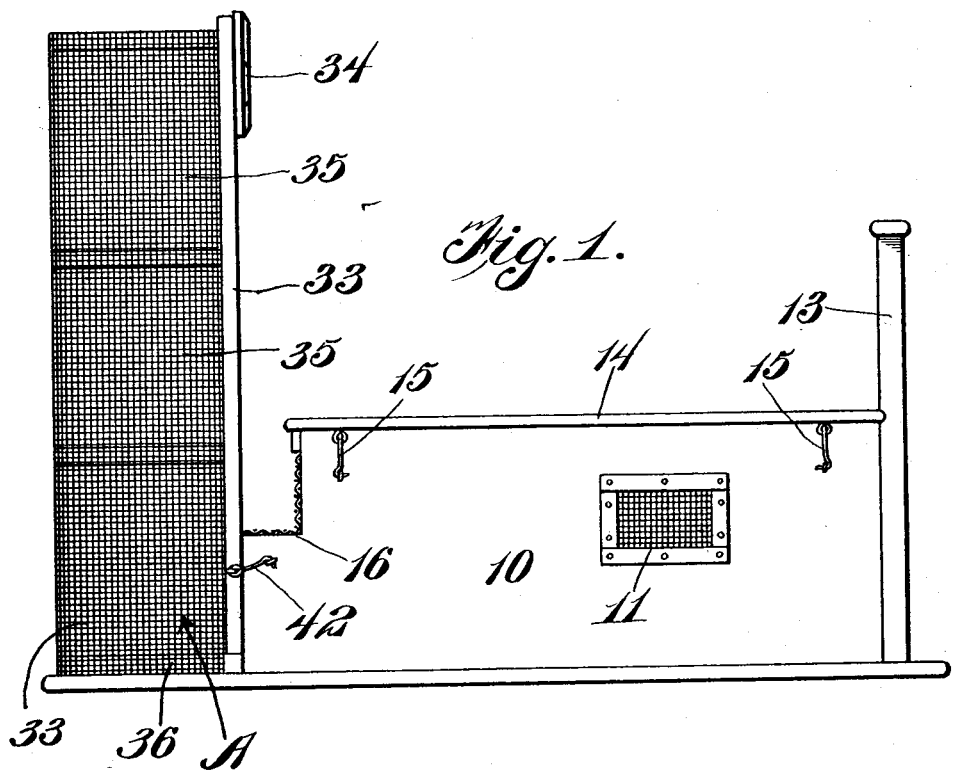
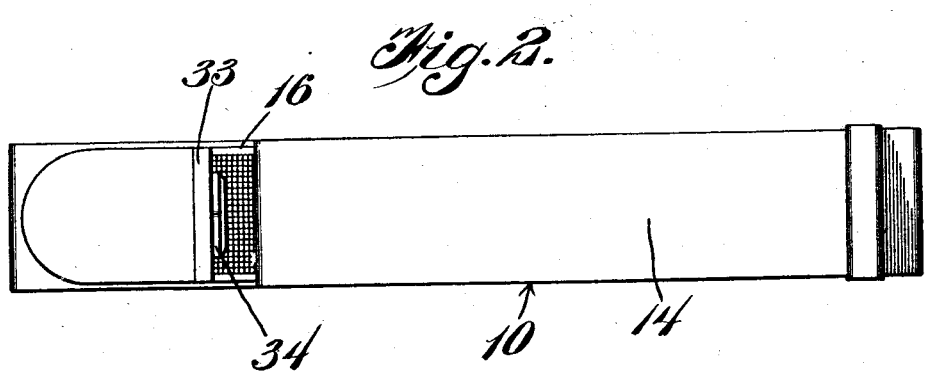
Inventor  
F. N. Watkins  
Watson E. Coleman  
Atty Oct. 27, 1925.
F. N. WATKINS
1,559,483
AUTOMATICALLY SET ANIMAL TRAP
Filed April 23, 1925     2 Sheets-Sheet 2
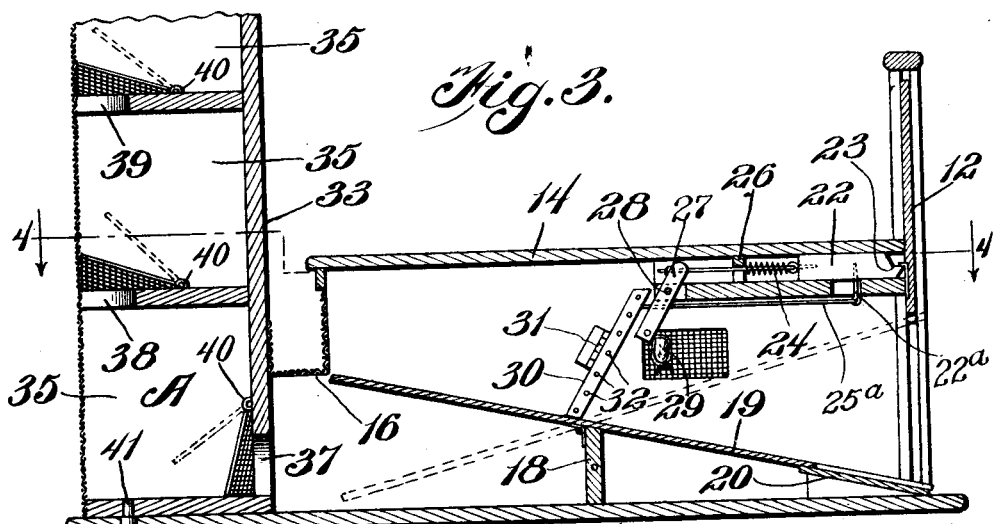
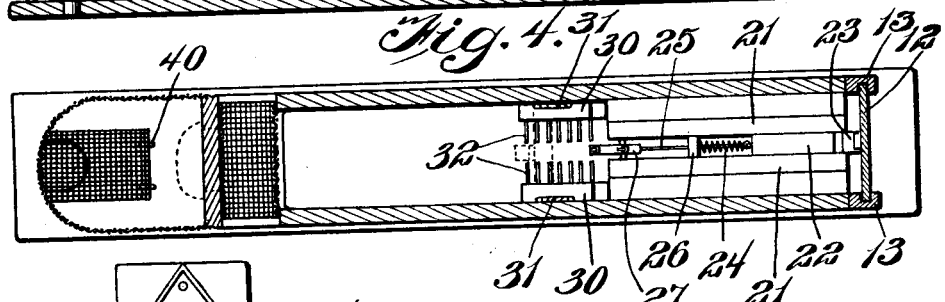
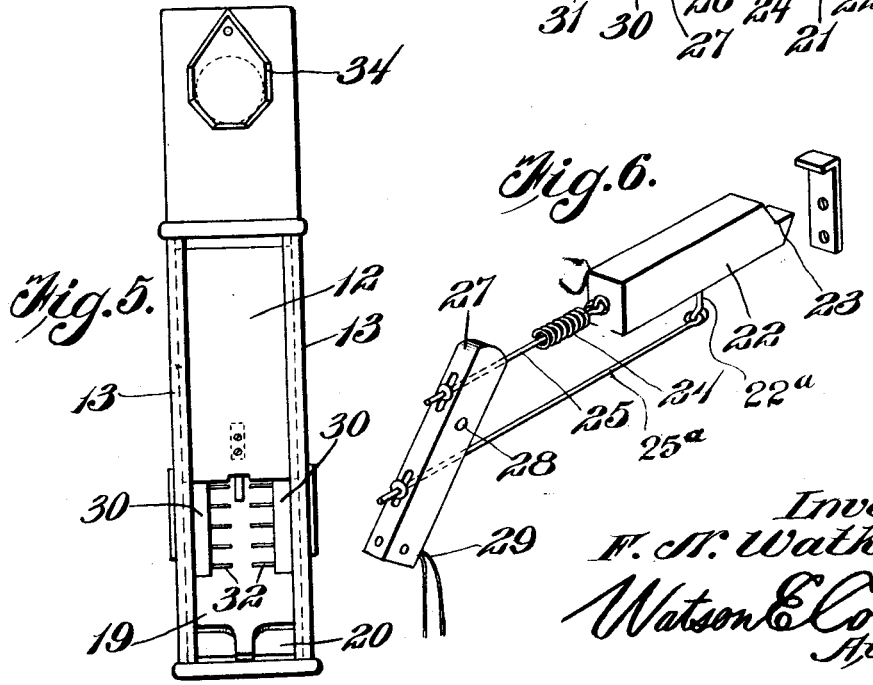
Inventor
F. N. Watkins
Watson E. Coleman
Atty Patented Oct. 27, 1925.

1,559,483

UNITED STATES PATENT OFFICE.

FINNIS N. WATKINS, OF PICHER, OKLAHOMA.

AUTOMATICALLY-SET ANIMAL TRAP.

Application filed April 23, 1925. Serial No. 25,378.

*To all whom it may concern:*

Be it known that I, FINNIS N. WATKINS, a citizen of the United States, residing at Picher, in the county of Ottawa and State of Oklahoma, have invented certain new and useful Improvements in Automatically-Set Animal Traps, of which the following is a specification, reference being had to the accompanying drawings.

This invention relates to traps, and particularly to those traps wherein there is a sliding door normally raised and held by a latch, the latch being released by a pull upon the bait.

The general object of the present invention is to provide a self-setting trap in which the animal, after it pulls the bait and has closed the door, moves onward over a pivoted support which, as it shifts under the weight of the rat or other animal, raises the door to its open position, thus permitting another animal to enter the trap.

A further object is to provide a device of this character having means whereby to prevent the animal from retracing its steps and so getting out of the trap.

A still further object is to provide a plurality of detachable cages mounted upon the trap into which the animals will climb in their endeavor to escape, each cage acting to furnish a still greater impediment to the return of the animal.

Another object is to provide a trap which is very simple in construction, may be easily made, and which has been found to be very effective in actual practice.

My invention is illustrated in the accompanying drawings, wherein:—

Figure 1 is a side elevation of a trap constructed in accordance with my invention;

Figure 2 is a top plan view of the trap;

Figure 3 is a longitudinal vertical sectional view through the trap;

Figure 4 is a section on the line 4—4 of Figure 3;

Figure 5 is an end elevation of the trap;

Figure 6 is a fragmentary perspective view showing the locking elements and the bait holder for the trap.

Referring to these drawings, it will be seen that I provide a casing, rectangular in cross section and which is longer than it is wide or high, the casing being designated 10. This casing is preferably made with imperforate side walls, except that one or both of the side walls may be provided with a window 11 having crossed bars or wire netting to prevent the escape of the animal therethrough, this window casting light upon the bait.

The forward end of this trap is closed by means of a door 12 sliding between guides 13, these guides extending above the top 14 of the trap a sufficient distance to permit the door to be entirely raised and thereby permit the entrance of an animal to the trap. The top 14 is hinged to the body of the trap and held closed by any suitable latching device 15. The opposite end of the body is stepped downward, as at 16, and then has a passage 17 communicating with a series of cages, as will be later described.

Disposed within the body 10 of the trap is a transversely extending support 18, and mounted upon this support is a balancing board or platform 19. This is hingedly mounted upon the support 18 and normally is disposed donward and toward the front of the trap so that its forward edge extends beyond the lower ends of the guides 13. This forward end of the trap rests upon a support 20.

Mounted in the upper portion of the trap are two laterally disposed guides 21, between which is disposed a sliding trigger 22, the forward end of which is toothed, as at 23, and engages with the sliding door 12 so as to hold this sliding door upward. This trigger is pressed forward by means of a spring 24. Attached to the trigger is a rod 25 which passes through the spring, the rear end of the spring bearing against a member 26, and the forward end of this rod is connected to a pivoted member 27 pivoted at 28 between the guides 21 and extending downwardly and supporting bait at 29. Secured to the under surface of the trigger 22 is a depending arm 22ª, to the lower end of which is attached a link 25ª which likewise is directed through the pivoted member 27 but at the opposite side of the pivot from the rod 25; these two rods arranged at opposite sides of the pivot serve to limit the movement of the trigger of the spring 24 and prevents it from bearing against the door 12 so that the door would be retarded by its friction. Disposed in advance of the bait support 27 is a gate formed of two leaves, each numbered 30, these leaves being hinged at 31 to the side walls of the trap and each of these leaves being formed with inwardly projecting prongs 32, as illustrated in Figure 4. The leaves of this gate are inclined downwardly and rearwardly toward the back of the trap so that the leaves will close under the action of gravity, but either or both leaves will open to permit the passage of an animal from the forward portion of the trap into the rear portion and when the animal is in the rear portion of the trap he can not pass backward through said leaves for the reason that the hinges are stop hinges which prevent the movement of the gate toward the opening of the trap beyond a position where the prongs are directly opposite each other, it being understood that these prongs are so disposed that while they will permit the animal to pass inward they will not permit the animal to pass outward.

When the animal passes the leaves 30 of the gate, the balancing board or platform 19 will be depressed by the weight of the animal, raising the forward portion of this board, which then raises the gate 12 to its board, which then raises the gate 12 to its highest position where it is caught by the teeth 23 of the latch and is so held. As the animal passes onto the rear portion of the platform it descends under his weight and the animal then passes into the portion 17 and from thence into one of the cages which are attached to the back of the trap. The stepped portion 16 is preferably of wire netting so as to give plenty of light, and the floor of the trap extends beyond the body thereof to form a support for a series of cages.

These cages, as illustrated in Figure 1, are all mounted upon a front wall 33, the upper end of which is formed with an outlet closed by a door 34. Preferably there are three of these cages, each designated 35, and the series of cages are closed by the end wall 36, the body of the cages being made of wire netting and there being an opening 37 whereby an animal may enter the lowest cage A, an opening 38 whereby the animal may climb into the second cage, and an opening 39 whereby it may climb into the third cage. Of course, the animal may remain in any one of the cages and then be discharged when the cages are dumped. These openings 37, 38 and 39 are guarded by wire netting entrance members so as to permit the entry of the animal into the cage but prevent his exit therefrom. Thus, for instance, these openings may be guarded by shields or doors of wire netting which are hinged at one end by the clips 40 or any other suitable means, these shields or doors closing by gravity. The bottom 36 of the series of cages is preferably engaged with the bottom of the body by means of a keeper bolt 41 acting as a cage anchor and by swinging latches 42, It will be seen that a trap constructed in accordance with my invention is self-setting, in that as soon as the animal has pulled on the bait the door is dropped, the animal then being trapped within the first chamber, instinctively passes into the second chamber, and once in there resets the trap and passes into the third chamber, from which he passes into the several cages in his desire to get out. Inasmuch as there are three cages of relatively large size engaged with the body of the trap, it is obvious that quite a large number of animals may be accommodated within the trap before the trap is so full that it has to be emptied. The mechanism is simple and yet positive in its operation, the trap may be constructed of wood, metal or any other suitable material and the details might be varied in many ways without departing from the spirit of the invention.

I design to make the trap in three sizes, one, for instance, for mice or animals of like size, another for rats or other animals of this size, and a third for skunks and the relatively larger animals.

I claim:—

1. A trap of the character described including a body having a vertical sliding door at one end, a platform hingedly supported at its middle and extending lengthwise of the body, one end of the platform being disposed in the path of movement of the door, a latch adapted to hold the door raised, a bait holder operatively engaged with the latch to release the same when the bait is pulled, and means disposed approximately at the middle of the platform permitting the passage of an animal from the forepart of the platform to the rear thereof only whereby to cause the downward movement of the rear of the platform and the upward movement of the door, the latch automatically engaging the door when it is raised.

2. A trap of the character described comprising a body having vertical guides at one end, a door slidingly mounted in said guides, a spring projected latch normally holding the door raised, a bait holder operatively engaged with the latch and adapted to support a bait, the bait holder when shifted by strain upon the bait acting to withdraw the latch, a platform hingedly mounted approximately at its middle within the body and having one end thereof disposed beyond said guides and in the path of movement of the door, said platform normally extending downwardly and forwardly, a gate mounted above the middle of the platform and permitting the passage of an animal from the forepart of the platform onto the rear thereof whereby to cause the depression of the rear of the platform and the raising of the gate.

3. A trap of the character described comprising a body, vertical guides at one end of the body, a gate slidingly mounted within said guides, longitudinally extending guides mounted upon the top of the body, a sliding latch mounted between said guides, a spring urging the latch into engagement with the gate, a bait holder pivotally mounted between said guides and being connected to the latch, means on the lower end of the bait holder for supporting bait, a platform pivotally supported approximately at its middle normally extending downwardly and forwardly and having one end disposed at the lower end of the path of movement of the gate whereby an animal resting upon the rear end of the platform will raise the gate, and means permitting the passage of an animal onto the rear of the platform but preventing the passage of the animal onto the forepart of the platform comprising opposed gate sections hingedly mounted upon the side walls of the body and urged to a closed position.

4. A trap of the character described including a body having a vertically sliding door at one end, a platform hingedly supported at its middle and extending lengthwise of the body, one end of the platform being disposed in the path of movement of the door, a spring pressed latch adapted to hold the door raised, a projecting latch upon the door for engaging said latch, a bait holder operatively engaged with the latch to release the same when the bait is pulled, means associated with the latch preventing engagement of the latch with the door when the latch is moved under the influence of the spring, and means permitting passage of the animal from the fore part of the platform to the rear thereof only, whereby to cause downward movement of the platform and upward movement of the door, the latch automatically engaging the catch of the door when the door is raised.

5. In an automatically re-set trap, a sliding door, a spring pressed latch, a catch upon the door for co-action with the latch holding the door in raised position, a trigger associated with the latch for tripping the same to permit the door to close, animal operated means for reopening the door and means connecting the latch and trigger holding the latch out of engagement with the door but in the path of movement with the catch of the door.

6. A trap of the character described including a body having a vertically sliding door at one end, a platform hingedly supported at its middle and extending lengthwise of the body, one end of the platform being disposed in the path of movement of the door, a latch adapted to hold the door raised, a bait holder operatively engaged with the latch to release the same when the bait is pulled, and means disposed approximately at the middle of the platform permitting the passage of an animal from the forepart of the platform to the rear thereof only, whereby to cause the downward movement of the rear of the platform and the upward movement of the door, the latch automatically engaging the door when it is raised, said platform forming the bottom of an animal passage from the door to the rear part of the trap and an exit from the rear part of the trap concealed by the platform while in normal position.

In testimony whereof I hereunto affix my signature.

FINNIS N. WATKINS.